United States Patent
Spengel et al.

(10) Patent No.: US 9,488,090 B2
(45) Date of Patent: Nov. 8, 2016

(54) CYLINDER BLOCK ARRANGEMENT WITH AN EXHAUST GAS SYSTEM

(71) Applicant: Daimler AG, Stuttgart (DE)

(72) Inventors: Christoph Spengel, Unterensingen (DE); Antonio Pepe, Stuttgart (DE); Peter Raitschev, Stuttgart (DE); Jutta Elisabeth Mueller, Leonberg-Warmbronn (DE); Clemens Schubert, Reichenbach (DE)

(73) Assignee: Daimler AG, Stuttgart (DE)

( * ) Notice: Subject to any disclaimer, the term of this patent is extended or adjusted under 35 U.S.C. 154(b) by 53 days.

(21) Appl. No.: 14/371,825

(22) PCT Filed: Jan. 11, 2013

(86) PCT No.: PCT/EP2013/000066
§ 371 (c)(1),
(2) Date: Jul. 11, 2014

(87) PCT Pub. No.: WO2013/104543
PCT Pub. Date: Jul. 18, 2013

(65) Prior Publication Data
US 2014/0352297 A1  Dec. 4, 2014

(30) Foreign Application Priority Data
Jan. 14, 2012  (DE) ........................ 10 2012 000 591

(51) Int. Cl.
*F01N 5/04* (2006.01)
*F01N 13/00* (2010.01)
(Continued)

(52) U.S. Cl.
CPC ............. *F01N 13/001* (2013.01); *F01N 3/021* (2013.01); *F01N 3/035* (2013.01); *F01N 3/103* (2013.01);
(Continued)

(58) Field of Classification Search
CPC ...... F01N 3/106; F01N 3/2066; F01N 13/02; F01N 3/021; F01N 3/103
USPC .......................................................... 60/280
See application file for complete search history.

(56) References Cited

U.S. PATENT DOCUMENTS 8,276,366 B2 * 10/2012 Bennet .................... F01N 3/021
60/280
2009/0151328 A1 * 6/2009 Winsor .................. F01N 3/021
60/280
(Continued)

FOREIGN PATENT DOCUMENTS

EP   1 162 098 A1   12/2001
EP   2 123 878 A1   11/2009
(Continued)

OTHER PUBLICATIONS

Japanese Office Action issued in counterpart Japanese Application No. 2014-551571 dated Jul. 14, 2015, with partial English translation (Fourteen (14) pages).
(Continued)

*Primary Examiner* — Jason Shanske
(74) *Attorney, Agent, or Firm* — Crowell & Moring LLP

(57) ABSTRACT

An engine block arrangement includes an engine block and an exhaust gas system. The exhaust gas system, viewed in the flow direction of an exhaust gas flow, includes an exhaust gas turbocharger, an oxidation catalytic converter, a feed device for a urea-water solution, a particle filter, and an SCR catalytic converter arranged one behind the other. The exhaust gas turbocharger, the oxidation catalytic converter, the feed device for the urea-water solution, the particle filter, and the SCR catalytic converter are situated together on the engine block along one side thereof, the side being oriented essentially perpendicularly with respect to an output side of the engine block.

22 Claims, 2 Drawing Sheets

Figure 1:
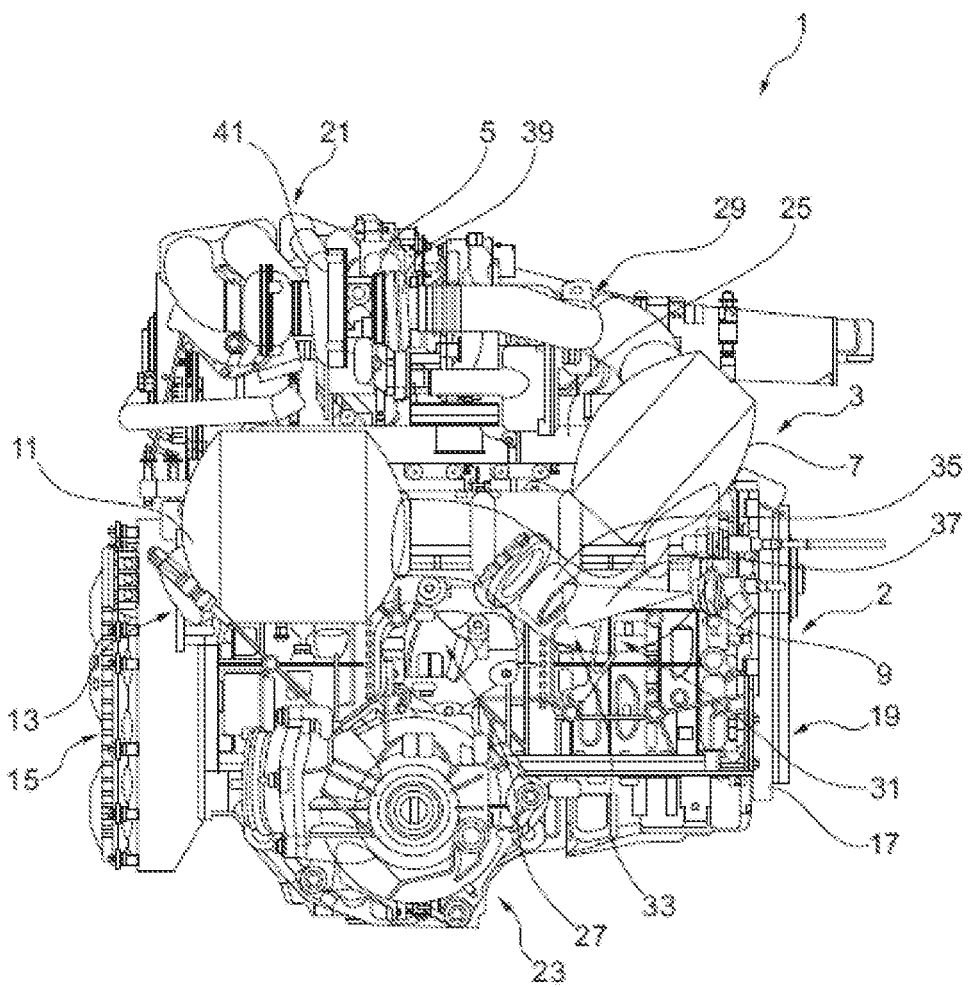

(51) Int. Cl.
*F01N 3/10* (2006.01)
*F01N 3/20* (2006.01)
*F01N 13/02* (2010.01)
*F01N 3/021* (2006.01)
*F01N 3/035* (2006.01)
*F02B 37/00* (2006.01)

(52) U.S. Cl.
CPC ............. *F01N 3/106* (2013.01); *F01N 3/2066* (2013.01); *F01N 13/009* (2014.06); *F01N 13/0097* (2014.06); *F01N 13/02* (2013.01); *F02B 37/00* (2013.01); *F01N 2250/02* (2013.01); *F01N 2340/02* (2013.01); *F01N 2340/06* (2013.01); *F01N 2610/02* (2013.01); *F01N 2610/1453* (2013.01); *Y02T 10/24* (2013.01)

(56) References Cited

U.S. PATENT DOCUMENTS

| | | | | |
|---|---|---|---|---|
| 2010/0083643 | A1* | 4/2010 | Hayashi | B01D 53/90 60/297 |
| 2010/0326054 | A1 | 12/2010 | Kato | |
| 2012/0222411 | A1* | 9/2012 | Yano | B01D 53/9418 60/297 |

FOREIGN PATENT DOCUMENTS

| | | |
|---|---|---|
| EP | 2 522 822 A1 | 11/2012 |
| JP | 2009-133228 A | 6/2009 |
| JP | 2010-083331 A | 4/2010 |
| JP | 2011-012563 A | 1/2011 |
| WO | WO 2008/111254 A1 | 9/2008 |
| WO | WO 2011/045847 A1 | 4/2011 |
| WO | WO 2011/087819 A2 | 7/2011 |

OTHER PUBLICATIONS

International Search Report (PCT/ISA/220 & PCT/ISA/210) dated Jul. 12, 2013 with English translation (seven pages).
German-language Written Opinion (PCT/ISA/237) dated Jul. 12, 2013 (six pages).
"BMW's New Six-Cylinder Diesel Engine" MTZ, Oct. 2011, pp. 762-768, vol. 72, with English translation.
English translation of Chinese Office Action issued in counterpart Chinese Application No. 201380005417.0 dated Jan. 28, 2016 (Three (3) pages).

* cited by examiner

CYLINDER BLOCK ARRANGEMENT WITH AN EXHAUST GAS SYSTEM

BACKGROUND AND SUMMARY OF THE INVENTION

Exemplary embodiments of the invention relate to an engine block arrangement having an exhaust gas system.

Engine block arrangements are already known in which components of the exhaust gas system are situated near an engine block. An article in Motortechnische Zeitschrift (MTZ), 10, 2011, pages 762-768 describes an engine block arrangement having an exhaust gas system of a diesel engine that includes an oxidation catalytic converter and a particle filter. Both elements are jointly situated in a housing on one side of the engine block. This has the advantage that these elements reach their operating temperature very quickly, and that heat losses from the exhaust gas, which occur over a fairly long distance from the engine to the components, may be kept low. The known exhaust gas system has only two components having exhaust emission control activity situated near the engine. In more complex exhaust gas systems, in particular those having an additional catalytic converter for a selective catalytic reaction (SCR catalytic converter), placement near the engine is typically not possible due to installation space reasons. An SCR catalytic converter is used to reduce nitrogen oxides (NOx), in particular in the exhaust gas of diesel internal combustion engines. For this purpose, a urea-water solution is introduced into the exhaust gas flow in the area of a mixing section, the mixing section being used to thoroughly mix the urea-water solution with the exhaust gas and as a reaction section, along which the urea reacts with the water to form ammonia and carbon dioxide. The ammonia in turn reacts in the SCR catalytic converter with the nitrogen oxides of the exhaust gas flow, thus lowering the nitrogen oxides concentration. The mixing section must have a certain length to ensure its functioning. For this reason, the SCR catalytic converter is typically situated in a vehicle underbody area in order to provide a sufficiently long path for the exhaust gas flow from the engine block to the SCR catalytic converter. This has the disadvantage that temperature and pressure losses occur in the exhaust gas flow. In addition, a sensor system for adding the urea-water solution as well as for the SCR catalytic converter must be laboriously mounted and connected to the vehicle electronics system. Furthermore, the arrangement of the components in the vehicle underbody area depends on the vehicle type, so that a large number of exhaust gas system variants is necessary, which entails logistical problems and high costs.

European patent document EP 2 123 878 A1 discloses a compact arrangement of a particle filter and an SCR catalytic converter in which the particle filter is connected to the SCR catalytic converter via a pipe extending essentially in an S shape. This allows a compact arrangement of the components next to one another, and at the same time, a sufficiently long mixing section between same. However, this compact arrangement per se is still provided in the vehicle underbody area, resulting in the corresponding disadvantages.

Exemplary embodiments of the present invention are directed to an engine block arrangement having an exhaust gas system that does not have the mentioned disadvantages. In particular, the aim is to avoid temperature and pressure losses in the exhaust gas flow to the greatest extent possible, to simplify connection and mounting of a sensor system in particular in the area of the SCR catalytic converter, and to implement the arrangement regardless of the vehicle type, thus greatly reducing the number of variants that must be kept on hand.

The exhaust gas system, viewed in the flow direction of an exhaust gas flow, includes the following components arranged one behind the other: an exhaust gas turbocharger, an oxidation catalytic converter, a feed device for urea-water solution, a particle filter, and an SCR catalytic converter. The engine is designed as an internal combustion engine, preferably as a diesel engine. The engine block arrangement is characterized in that the exhaust gas turbocharger, the oxidation catalytic converter, the feed device for urea-water solution, the particle filter, and the SCR catalytic converter are situated together on the engine block along one side thereof. The side on which the components of the exhaust gas system are situated is oriented essentially perpendicularly with respect to an output side of the engine block. The term "output side" refers to the side of the engine block at which a transmission is situated. If the internal combustion engine is designed as a diesel engine, the oxidation catalytic converter is preferably designed as a diesel oxidation catalytic converter. Correspondingly, the particle filter is preferably designed as a diesel particle filter. Due to the components of the exhaust gas system being jointly situated on the same side of the engine block, these components are situated very close to one another and near the engine, so that they are heated by the waste heat of the engine, i.e., they quickly reach and maintain their operating temperature. In addition, due to the resulting small line lengths, temperature and pressure losses in the exhaust gas flow are largely avoided. The arrangement is independent of the specific vehicle type, since the exhaust gas system together with the engine block is designed as a module, in a manner of speaking. The exhaust gas system together with the engine block may thus be accommodated in an engine compartment of the vehicle. None of the mentioned components of the exhaust gas system is accommodated in the area of a vehicle underbody. Due to all components being jointly situated on one side of the engine block, mounting and connection of the sensor system for the exhaust gas system is also greatly simplified.

The engine block arrangement can also include the particle filter and the SCR catalytic converter being situated together in a container. The container is also referred to as a "combi-box," and is typically designed as a sheet steel housing having an inlet funnel for supplying exhaust gas into the housing, and an outlet funnel for discharging cleaned exhaust gas from the housing. Due to the closely adjoining arrangement in a shared housing, in particular temperature and pressure losses between the particle filter and the SCR catalytic converter are largely avoided.

In addition, an engine block arrangement can include the particle filter having inlet channels and outlet channels, and walls of the inlet channels with a coating for a selective catalytic reaction, i.e., an SCR catalyst coating. Walls of the outlet channels preferably also have an SCR catalyst coating. As a result, the particle filter may already have a selective catalytic action with regard to nitrogen oxides reduction. This reduction in NOx in addition to the NOx reduction by the downstream SCR catalytic converter allows particularly low NOx emission values.

The engine block arrangement can have the components of the exhaust gas system situated relative to one another in such a way that the exhaust gas flow from an outlet from the exhaust gas turbocharger to an outlet from the SCR catalytic converter undergoes at least one deflection of the main exhaust gas flow direction by approximately 180°. If exactly one deflection by approximately 180° is provided, the length of the engine block is preferably utilized twice for situating the components of the exhaust gas system at the engine block. If two deflections by approximately 180° are provided, this length is correspondingly utilized three times. Similarly, it is also possible to provide more than two deflections by 180°. The number of deflections makes it possible to coordinate the arrangement of the components of the exhaust gas system, i.e., the exhaust gas turbocharger, the oxidation catalytic converter, the feed device for the urea-water solution, the particle filter, and the SCR catalytic converter, on a specific engine block, and in particular to coordinate with the length of the engine block. Thus, for an engine block having a fairly large overall length it is sufficient to provide only one deflection by approximately 180°. If a smaller overall length is available, for example two or also more than two deflections by approximately 180° may be provided.

The engine block arrangement can also have the exhaust gas turbocharger and oxidation catalytic converter connected to one another by a pipe extending essentially in the longitudinal direction of the engine block. A "longitudinal direction" refers to the direction of the engine block which extends from the output side of the engine block to a side facing away from same. The side facing away from the output side of the engine block is also referred to as a vibration damper side due to the fact that a vibration damper is preferably provided here. When the term "vibration damper side" is used below, this is not to be construed in a limiting manner such that a vibration damper must necessarily be provided on this side. Instead, the term is used for short for the side facing away from the output side of the engine block. In the engine block arrangement, a flow length for the exhaust gas from an exhaust gas turbocharger outlet to an oxidation catalytic converter inlet is less than 300 mm, preferably 200 mm.

The engine block arrangement can also include the oxidation catalytic converter and the particle filter being connected to one another by a pipe and situated relative to one another in such a way that the exhaust gas flow from an oxidation catalytic converter outlet to a particle filter inlet undergoes a deflection of essentially 90°. This is provided when a relatively large overall length is available for the components of the exhaust gas system. This is the case when the engine block is installed in a vehicle in the longitudinal direction. If a smaller overall length is available, which may be the case in particular when the engine block is installed crosswise, it is preferably provided that the exhaust gas flow from an oxidation catalytic converter outlet to a particle filter inlet undergoes two deflections by essentially 180°. The exhaust gas flow is then deflected once by 180° after it exits from the oxidation catalytic converter, is preferably returned for a certain distance, and lastly is deflected a second time by 180°, so that it enters the particle filter essentially in the same direction in which it has also entered the oxidation catalytic converter.

The engine block arrangement can also have the pipe, which is between the oxidation catalytic converter and the particle filter, include a mixing section along which the feed device for urea-water solution and preferably a static mixer in particular are situated. The mixer is used for thorough intermixing of the urea-water solution with the exhaust gas flow. The pipe between the oxidation catalytic converter and the particle filter is preferably designed to be long enough to allow at least essentially complete thermolysis and/or hydrolysis of the urea introduced into the exhaust gas.

The engine block arrangement can have the exhaust gas turbocharger situated substantially, preferably completely, above an exhaust manifold. This results in additional installation space for the arrangement of the exhaust gas system at the engine block.

The engine block arrangement can have the oxidation catalytic converter situated substantially above the exhaust manifold. In particular, when the oxidation catalytic converter is situated approximately at the level of the exhaust gas turbocharger, a connection between these elements may be kept as short as possible.

The engine block arrangement can also have the particle filter and the SCR catalytic converter situated substantially below the exhaust manifold and substantially, preferably completely, above an engine mounting, and preferably approximately centrally relative to the exhaust gas turbocharger. In the preferred embodiment, the exhaust gas turbocharger in a top view is thus situated approximately centrally with respect to the preferably closely adjoining components, namely, the particle filter and SCR catalytic converter, situated in a shared housing.

In this way, optimal use is made of an installation space at the side of the engine block, and the components do not collide with the engine mounting.

The engine block arrangement can also include the exhaust gas turbocharger being situated closer to the output side of the engine block than to the vibration damper side of the engine block, the oxidation catalytic converter being situated closer to the vibration damper side than to the output side. In particular when only one deflection of the exhaust gas flow by 180° is provided, this ensures particularly space-saving and favorable guiding of the exhaust gas flow, and thus, the arrangement of the components of the exhaust gas system. In particular when the engine block is installed lengthwise, viewed in the vehicle direction, in this case an outlet from the SCR catalytic converter is oriented toward the vehicle rear end. In that case, it is not necessary to provide additional deflection of the exhaust gas flow downstream from the SCR catalytic converter.

The engine block arrangement can also have the exhaust gas turbocharger and the oxidation catalytic converter situated relative to one another in such a way that the exhaust gas flow from an exhaust gas turbocharger outlet to an oxidation catalytic converter inlet undergoes a deflection of essentially 90°. The exhaust gas turbocharger is preferably aligned in the longitudinal direction of the engine block, i.e., essentially horizontally. The exhaust gas then preferably flows through the oxidation catalytic converter in a direction that is oriented essentially perpendicularly with respect to the longitudinal direction of the engine block, and preferably oriented toward a bottom side of the engine block. The exhaust gas flow through the oxidation catalytic converter preferably also takes place from top to bottom, viewed relative to the vehicle in which the engine block is installed.

The engine block arrangement can also include the exhaust gas turbocharger being situated closer to the vibration damper side of the engine block than to the output side of the engine block. The oxidation catalytic converter is then situated closer to the output side than to the vibration damper side. This arrangement is preferred when a fairly small overall length is available, so that two deflections of the exhaust gas flow by 180° may be necessary. This may be the case when the engine block is installed crosswise, viewed in the direction of the vehicle. However, it is also possible to implement the described arrangement for a lengthwise installation, in particular when little installation space is available. In this case, due to the two deflections of the exhaust gas flow by 180°, in this arrangement as well the exhaust gas exits the SCR catalytic converter toward the vehicle rear end, so that no further deflection is necessary.

The engine block arrangement can include the oxidation catalytic converter being situated relative to the mixing section, and the mixing section being situated relative to the particle filter, in such a way that the exhaust gas flow from an oxidation catalytic converter outlet to an inlet into the mixing section undergoes a deflection of essentially 180°, and from an outlet from the mixing section to an inlet into the particle filter undergoes a deflection of essentially 180°. Thus, two deflections of the exhaust gas flow by 180° are provided, an S-shaped connection, in a manner of speaking, of the oxidation catalytic converter to the particle filter being provided which includes the mixing section. The mixing section is therefore situated between the oxidation catalytic converter and the particle filter in such a way that the exhaust gas flows back, in a manner of speaking, through the mixing section, viewed in the longitudinal direction, whereby the flow through the oxidation catalytic converter and through the particle filter takes place in the same direction, while the flow through the mixing section takes place in the opposite direction. As stated above, such an arrangement of the components of the exhaust gas system is suited for installation situations having limited installation space or limited overall length. This may typically be the case when the engine block is installed crosswise, viewed in the vehicle direction.

Lastly, the engine block arrangement can have the particle filter and the SCR catalytic converter situated substantially below the exhaust gas turbocharger and also substantially below the oxidation catalytic converter. This means a particularly compact arrangement of the components, which logically are situated close to one another in order to minimize temperature and pressure losses. The components are preferably situated next to one another in pairs, namely, the exhaust gas turbocharger and the oxidation catalytic converter on the one hand and the particle filter and the SCR catalytic converter on the other hand.

BRIEF DESCRIPTION OF THE DRAWING FIGURES

Figure 2:
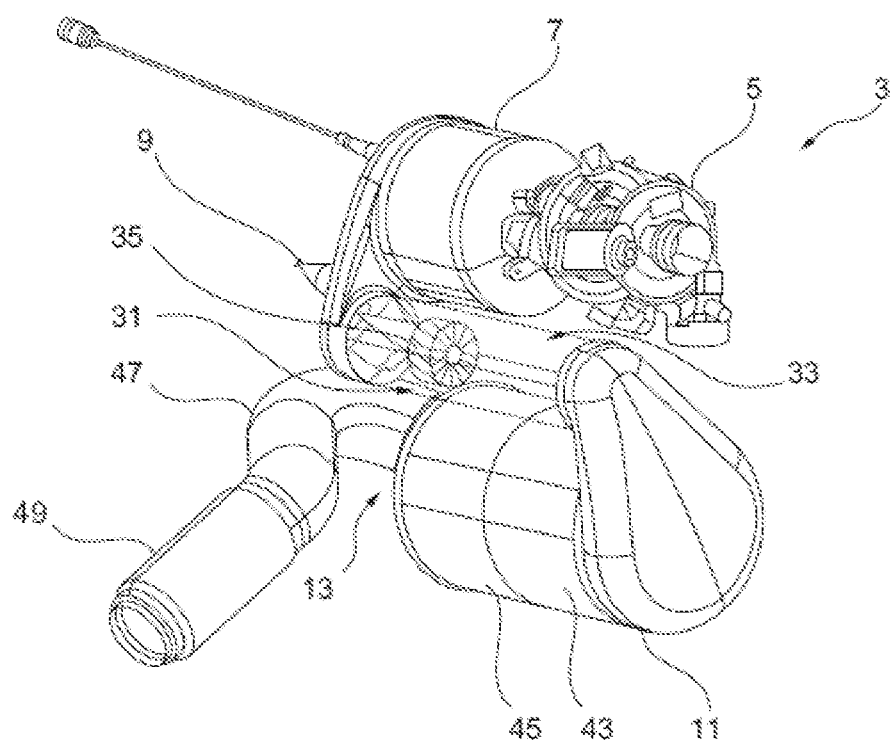

The invention is described in greater detail below with reference to the drawings, which show the following:

FIG. 1 shows a schematic view of one exemplary embodiment of an engine block arrangement having an exhaust gas system having a fairly large overall length, and FIG. 2 shows a second exemplary embodiment of an exhaust gas system having a fairly small overall length.

DETAILED DESCRIPTION

FIG. 1 shows a schematic view of a first exemplary embodiment of an engine block arrangement 1 having an engine block 2 and an exhaust gas system 3. The exhaust gas system, viewed in the flow direction of an exhaust gas flow from the engine block 2 to an exhaust (not illustrated), includes an exhaust gas turbocharger 5, an oxidation catalytic converter 7, a feed device 9 for urea-water solution, a particle filter, and an SCR catalytic converter situated one behind the other, the latter two components being situated together in a container 11, also referred to as a combi-box, and also includes a joint 13 for connecting a pipe connection, not illustrated, which leads to a muffler, likewise not illustrated, and lastly, to an exhaust. A decoupling element, not illustrated, is preferably provided directly in the connection to the joint 13 in order to vibrationally decouple the parts situated downstream, viewed in the flow direction of the exhaust gas, from the components of the exhaust gas system 3 illustrated in FIG. 1.

The exhaust gas turbocharger 5, the oxidation catalytic converter 7, the feed device 9, the particle filter, and the SCR catalytic converter are situated together on the engine block 2 along a side of the engine block facing the observer in FIG. 1. This side is essentially perpendicular to an output side 15, which preferably may be brought into operative connection with a transmission. The engine block 2 illustrated here has a vibration damper 17 on a side facing away from the output side 15. The side facing away from the output side 15 is therefore also referred to as the vibration damper side 19. This term is not intended to mean that the engine block 2 must necessarily include a vibration damper 17. The term, without any limitation, is merely used as a short form to designate the side of the engine block 2 which faces away from the output side 15. A longitudinal direction of the engine block 2 extends from the output side 15 to the vibration damper side 19. It is thus shown that the exhaust gas system 3 also extends along the engine block 2, essentially in the longitudinal direction thereof. It is possible to install the engine block 2 lengthwise in a motor vehicle, viewed in the direction of the motor vehicle. This is referred to as lengthwise installation. In this regard, the longitudinal direction of the engine block 2 and the longitudinal direction of the motor vehicle are oriented in parallel to one another. It is also possible to install the engine block 2 crosswise in a motor vehicle, viewed in the longitudinal direction of the motor vehicle. This is referred to as crosswise installation. In this case, the longitudinal direction of the engine block 2 is oriented perpendicularly with respect to the longitudinal direction of the motor vehicle. The engine block 2 has a top side 21 and a bottom side 23. During installation in a motor vehicle, the top side 21 is oriented upwardly, while the bottom side 23 is oriented downwardly.

If the engine block 2 is installed lengthwise in a motor vehicle, the output side 15 typically faces the rear end of the vehicle. On the other hand, if the engine block is installed crosswise, the output side 15 typically faces to the left, viewed in the travel direction, i.e., toward the driver's side of the motor vehicle, at least in Central Europe.

In the exemplary embodiment illustrated in FIG. 1, the exhaust gas turbocharger 5 is situated completely above an exhaust manifold 25. In another exemplary embodiment it is possible for the exhaust gas turbocharger 5 to be situated substantially above the exhaust manifold 25.

The particle filter and the SCR catalytic converter, and thus the container 11, is/are situated substantially below the exhaust manifold 25 and substantially above an engine mounting 27 by means of which the engine block 2 may be affixed to the vehicle body. It is possible for the particle filter and the SCR catalytic converter to be situated completely below the exhaust manifold 25 and/or completely above the engine mounting 27. They are preferably situated approximately centrally relative to the exhaust gas turbocharger 5. This means that these elements are situated essentially at the same position over a distance which extends from the output side 15 to the vibration damper side 19.

The exhaust gas turbocharger 5 and the oxidation catalytic converter 7 are connected to one another by a pipe 29. The pipe extends essentially in the longitudinal direction of the engine block 2. A flow length for the exhaust gas from an outlet of the exhaust gas turbocharger 5 to an inlet into the oxidation catalytic converter 7 is preferably less than 300 mm, particularly preferably approximately 200 mm. It is thus possible to minimize pressure and/or temperature losses in the exhaust gas flow between the exhaust gas turbocharger 5 and the oxidation catalytic converter 7.

A catalytic converter heating disk, not illustrated here, is preferably connected upstream from the oxidation catalytic converter 7. The oxidation catalytic converter may thus be brought to its operating temperature more quickly than is possible solely by heating via the exhaust gas flow. The catalytic converter heating disk itself preferably includes a catalyst coating, which in addition to the oxidation catalytic converter 7 thus acts as an upstream catalytic converter.

The oxidation catalytic converter 7 and the particle filter are connected to one another by a pipe 31, which includes a mixing section 33 along which the feed device 9 is situated. The mixing section 33 preferably includes a mixer 35 which particularly preferably is designed as a static mixer. In one exemplary embodiment, the mixer includes distribution elements, for example blades, which are stationary relative to the pipe 31 and the exhaust gas flow, in order to bring about turbulence of the exhaust gas flow and in particular thorough mixing thereof with the urea-water solution that is added via the feed device 9. It is also possible to provide a dynamic mixer 35 having elements that are moved relative to the exhaust gas pipe 33 and also relative to the exhaust gas flow in order to achieve intermixing. The urea-water solution added via the feed device 9 is schematically illustrated here by a spray cone 37.

The mixing section 33 should have a sufficient length for the added urea-water solution to be able to react to form ammonia and carbon dioxide before the urea-water solution together with the exhaust gas flow enters the particle filter and/or the SCR catalytic converter. For this purpose, the mixing section 33 preferably has a length of 100 mm to 300 mm, measured from a position of the feed device 9 to an inlet into the particle filter, or in the present case, into the container 11.

The feed device 9 is preferably situated as close as possible to the oxidation catalytic converter 7, particularly preferably at a distance of 50 mm to 100 mm from an outlet of the oxidation catalytic converter.

The particle filter and the SCR catalytic converter are preferably situated one behind the other at a short distance of a few centimeters, preferably less than 25 mm, particularly preferably approximately 15 mm, from one another. Heat losses in the exhaust gas flow between the two components may thus be kept low. Placing the components close together is particularly easily possible when the components are situated together in the container 11. It is very particularly preferred that the particle filter and the SCR catalytic converter have the same diameter or cross-sectional dimensions in order to keep pressure losses in the exhaust gas flow as low as possible. The two elements preferably have a diameter of 7.5 inches. The oxidation catalytic converter also preferably has a diameter that substantially, particularly preferably completely, corresponds to the diameter of the particle filter and of the SCR catalytic converter. It is possible for the oxidation catalytic converter 7 to have a diameter of 6.2 inches, and it is likewise possible for it have a diameter of 7.5 inches. Other diameters of the mentioned elements are also possible.

The particle filter preferably has inlet channels and outlet channels, whereby walls of the inlet channels and particularly preferably also walls of the outlet channels have an SCR catalyst coating. The particle filter is therefore designed as a so-called SD particle filter. It is thus possible for the particle filter to assist in the selective catalytic activity of the SCR catalytic converter.

As shown in FIG. 1, the components of the exhaust gas system 3 are situated relative to one another in such a way that the exhaust gas flow from an outlet from the exhaust gas turbocharger to an outlet from the SCR catalytic converter or from the container 11 undergoes a deflection by approximately 180°. This arrangement is preferred when a relatively large overall length is available for the exhaust gas system 3. This arrangement is preferred in particular when the engine block 2 is installed lengthwise in a vehicle. However, it is also possible to implement the arrangement shown in FIG. 1 with a crosswise installation of the engine block 2 when a sufficient overall length is available.

In the illustrated exemplary embodiment, the exhaust gas turbocharger 5 is situated closer to the output side 15 than to the vibration damper side 19. The exhaust gas turbocharger is oriented in such a way that its turbine side 39 is oriented toward the vibration damper side 19, while its compressor side 41 is oriented toward the output side 15. The exhaust gas flow exiting the exhaust gas turbocharger 5 thus initially flows in the direction of the vibration damper side 19.

The oxidation catalytic converter 7 is situated closer to the vibration damper side 19 than to the output side 15. The exhaust gas turbocharger 5 and the oxidation catalytic converter 7 are situated relative to one another so that the exhaust gas flow from an outlet of the exhaust gas turbocharger 5 to an inlet into the oxidation catalytic converter 7 undergoes a deflection of essentially 90°. In particular, the exhaust gas preferably flows through the oxidation catalytic converter 7 in a direction oriented essentially perpendicularly with respect to the longitudinal direction of the engine block 2 and preferably toward its bottom side 23. The deflection preferably takes place as close as possible to an inlet into the oxidation catalytic converter 7. This ensures that the pipe 29 extends essentially in the longitudinal direction of the engine block 2, since the deflection to the oxidation catalytic converter 7 initially takes place near the inlet into the oxidation catalytic converter.

It is possible for the exhaust gas flow from the exhaust gas turbocharger 5 toward the oxidation catalytic converter 7 to undergo two deflections of essentially 90°. For example, it is possible for the oxidation catalytic converter 7 in FIG. 1 to be situated closer to an observer than is the exhaust gas turbocharger 5. The exhaust gas flow may then be diverted in a first 90° deflection toward the observer and in a second downward 90° deflection. Of course, it is likewise possible for the oxidation catalytic converter 7 to be situated farther from an observer than is the exhaust gas turbocharger 5. In this case as well, the two 90° deflections preferably take place near the inlet into the oxidation catalytic converter 7, so that the pipe 29 extends essentially in the longitudinal direction of the engine block 2.

If the exhaust gas flow passes through the oxidation catalytic converter 7 essentially perpendicularly and toward the bottom side 23, the exhaust gas flow from an outlet from the oxidation catalytic converter 7, where it exits essentially perpendicularly, to an inlet into the particle filter undergoes a deflection of essentially 90°. The mixing section 33 then preferably extends essentially parallel to the longitudinal direction of the engine block 2.

Accordingly, flow preferably passes through the container 11, and thus the particle filter and the SCR catalytic converter in the exemplary embodiment illustrated in FIG. 1, essentially in the longitudinal direction of the engine block 2.

The joint 13 is preferably configured in such a way that the exhaust gas flow undergoes a deflection of approximately 45° toward the bottom side 23. The joint is particularly preferably situated near the output side 15 of the engine block 2, in particular at a distance of 100 mm or less than 100 mm. The joint 13 is very particularly preferably situated within an engine compartment of the motor vehicle, i.e., upstream from a unit partition or end wall which separates the engine compartment from a passenger compartment.

It is clear from FIG. 1 that the particle filter and the SCR catalytic converter, in the present case the container 11, is/are situated substantially below the exhaust gas turbocharger 5 and also substantially below the oxidation catalytic converter 7. In the illustrated exemplary embodiment, the container 11 is situated completely below the exhaust gas turbocharger 5 and substantially below the oxidation catalytic converter 7.

With regard to the exemplary embodiment according to FIG. 1, it is also shown that the exhaust gas preferably flows to the container 11, i.e., the particle filter and the SCR catalytic converter, in a direction that is deflected by approximately 180° relative to the flow direction at the outlet from the exhaust gas turbocharger 5.

FIG. 2 shows a schematic illustration of a second exemplary embodiment of the arrangement of an exhaust gas system 3 on an engine block 2, not illustrated here. Identical and functionally equivalent elements are provided with the same reference numerals, so that in this regard reference is made to the preceding description. The exemplary embodiment illustrated here is preferably provided when the available overall length is not sufficient for the arrangement according to FIG. 1. This may be the case in particular when the engine block 2 is installed crosswise in a motor vehicle.

Namely, it is shown that the components of the exhaust gas system 3 in the arrangement according to FIG. 1 are situated relative to one another in such a way that the exhaust gas flow from an outlet from the exhaust gas turbocharger 5 to an outlet from the SCR catalytic converter essentially undergoes a deflection by approximately 180°. This means that the flow direction of the exhaust gas at the outlet from the SCR catalytic converter is oriented in a rotation by approximately 180° relative to the flow direction at the outlet from the exhaust gas turbocharger 5. In contrast, in the exemplary embodiment according to FIG. 2, the components are situated relative to one another in such a way that the exhaust gas flow undergoes essentially two deflections by approximately 180°. The flow direction of the exhaust gas at an outlet from the SCR catalytic converter is thus oriented essentially parallel to the flow direction at the outlet from the exhaust gas turbocharger 5.

Whereas in the arrangement according to FIG. 1 the overall length of the engine block 2 is utilized twice, in a manner of speaking, for the arrangement of the exhaust gas system 3, in the exemplary embodiment according to FIG. 2 it is utilized three times. The arrangement of the exhaust gas system 3 in the exemplary embodiment according to FIG. 2 is correspondingly narrower overall.

In particular, in the exemplary embodiment according to FIG. 2 the exhaust gas turbocharger 5 is situated closer to the vibration damper side 19 of the engine block 2, not illustrated, than to the output side 15 of the engine block. The oxidation catalytic converter 7 is situated closer to the output side 15 than to the vibration damper side 19.

The oxidation catalytic converter 7 is situated in such a way that it is positioned at approximately the same level as the exhaust gas turbocharger 5, whereby no deflection of the exhaust gas flow from the exhaust gas turbocharger 5 toward the oxidation catalytic converter 7 is provided. In particular, both components may thus be situated very close to one another.

The oxidation catalytic converter 7 is situated relative to the mixing section 33 in such a way that the exhaust gas flow from an outlet from the oxidation catalytic converter to an inlet into the mixing section 33 undergoes a deflection of essentially 180°. At the same time, the mixing section 33 is situated relative to the particle filter 43 illustrated here in such a way that the exhaust gas flow from an outlet from the mixing section 33 to an inlet into the particle filter once again undergoes a deflection of essentially 180°. It is also possible to associate this deflection with the mixing section 33, since intermixing still takes place in the mixing section. It is important that the exhaust gas flow is deflected essentially by 180° in the area of the mixing section 33 toward the inlet into the particle filter 43.

Similarly, in the arrangement according to FIG. 2 the oxidation catalytic converter 7 and the particle filter 43 are situated relative to one another in such a way that the exhaust gas flow from the outlet from the oxidation catalytic converter 7 to the inlet into the particle filter 43 undergoes two deflections of essentially 180°.

Thus, when the exhaust gas flows from the outlet from the exhaust gas turbocharger 5 through the oxidation catalytic converter 7 in a direction which extends, so to speak, from the vibration damper side 19 to the output side 15, the exhaust gas flows through the mixing section 33 in the opposite direction, namely, from the output side 15 to the vibration damper side 19. The exhaust gas is then deflected once again, so that it flows through the particle filter 43 and the SCR catalytic converter 45 likewise illustrated here, and thus through the container 11, in a direction opposite from the flow direction in the mixing section 33, and is preferably oriented from the vibration damper side 19 toward the output side 15. Thus, the overall flow direction through the particle filter 43 and the SCR catalytic converter 45 is oriented parallel to the flow direction through the oxidation catalytic converter 7, while the flow direction through the mixing section 33 is oriented opposite this flow direction.

The exhaust gas system 3 is preferably situated in a motor vehicle downstream from the engine block 2 when the engine block is installed crosswise. The exhaust gas system is then situated in an engine compartment between the engine block 2 and a unit partition with respect to the passenger compartment. If the output side 15 faces to the right, viewed in the travel direction, for a crosswise installation of the engine block 2, the above-described flow directions preferably extend in the reverse sense with respect to the output side 15 and the vibration damper side 19. In another exemplary embodiment, however, it is also possible for not only the engine block 2, but also the components of the exhaust gas system 3 to be situated in the reverse sense, resulting in a mirror-image arrangement, in a manner of speaking, with regard to the exemplary embodiment according to FIG. 2.

In the area of the joint 13, a pipe 47 is provided which for a crosswise installation of the engine block 2 deflects the flow direction of the exhaust gas flow toward the rear end of the vehicle. The pipe 47 includes a decoupling element 49.

To further reduce heat loss in the exhaust gas system 3 and to decrease thermal load on the vehicle installation space, the exhaust gas system 3 is preferably provided with solid insulation; i.e., the pipes 29, 31, and 47 and preferably also the components of the exhaust gas system 3 are provided throughout with thermal insulation, for example by winding or by air gap insulation.

Overall, it is shown that the engine block arrangement 1 allows an arrangement of all components of the exhaust gas system 3 near the engine, as the result of which no heat losses occur in the exhaust gas flow. In addition, pressure losses in the exhaust gas flow are reduced due to short paths in conjunction with large cross sections, preferably a pipe cross section of 80 mm, and a reduction of the inlet and outlet locations in the various components. It is possible for the exhaust gas sensor system to be situated near the engine, and in an optimal manner in particular with regard to integration into an engine wiring harness. The feed device 9 may be easily cooled via an engine cooling water circuit. Overall, the arrangement of the exhaust gas system 3 is no longer dependent on the vehicle type and the vehicle characteristics (steering variant, drive type), so that the number of possible exhaust gas system variants is reduced. Despite the compact arrangement of the exhaust gas system 3, a sufficiently large overall length for the mixing section 33 is available between the oxidation catalytic converter 7 and the particle filter 43, so that effective addition and distribution of the urea-water solution is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An engine block arrangement, comprising:
an engine block; and
an exhaust gas system, comprising, in a flow direction of an exhaust gas flow, an exhaust gas turbocharger, an oxidation catalytic converter, a feed device for a urea-water solution, a particle filter, and an SCR catalytic converter arranged one behind the other,
wherein the exhaust gas turbocharger, the oxidation catalytic converter, the feed device for urea-water solution, the particle filter, and the SCR catalytic converter are situated together on the engine block along one side of the engine block that is oriented perpendicularly with respect to an output side of the engine block, and the exhaust gas turbocharger is situated substantially above an exhaust manifold, and
wherein the particle filter and the SCR catalytic converter are situated substantially below the exhaust gas turbocharger.

2. The engine block arrangement of claim 1, wherein the particle filter has inlet channels and outlet channels, and wherein at least walls of the inlet channels have an SCR catalyst coating.

3. The engine block arrangement of claim 1, wherein the exhaust gas turbocharger, the oxidation catalytic converter, the feed device for urea-water solution, the particle filter, and the SCR catalytic converter are situated relative to one another in such a way that the exhaust gas flow from an outlet from the exhaust gas turbocharger to an outlet from the SCR catalytic converter undergoes at least one deflection by 180°.

4. The engine block arrangement of claim 1, wherein the oxidation catalytic converter and the particle filter are connected to one another by a pipe, and situated relative to one another in such a way that the exhaust gas flow from an oxidation catalytic converter outlet to a particle filter inlet undergoes a deflection of 90°, or two deflections of 180°.

5. The engine block arrangement of claim 1, wherein the oxidation catalytic converter is situated substantially above the exhaust manifold.

6. The engine block arrangement of claim 1, wherein the particle filter and the SCR catalytic converter are situated substantially below the oxidation catalytic converter.

7. The engine block arrangement of claim 1, wherein the exhaust gas turbocharger is situated closer to the output side of the engine block than to a side of the engine block facing away from the output side, the oxidation catalytic converter is situated closer to the side facing away from the output side of the engine block than to the output side of the engine block.

8. An engine block arrangement, comprising:
an engine block; and
an exhaust gas system comprising, in a flow direction of an exhaust gas flow, an exhaust gas turbocharger, an oxidation catalytic converter, a feed device for a urea-water solution, a particle filter, and an SCR catalytic converter arranged one behind the other,
wherein the exhaust gas turbocharger, the oxidation catalytic converter, the feed device for urea-water solution, the particle filter, and the SCR catalytic converter are situated together on the engine block along one side thereof, the particle filter and the SCR catalytic converter are situated substantially below an exhaust manifold and substantially above an engine mounting situated above a bottom of the engine block.

9. The engine block arrangement of claim 8, wherein the particle filter has inlet channels and outlet channels, and wherein at least walls of the inlet channels have an SCR catalyst coating.

10. The engine block arrangement of claim 8, wherein the exhaust gas turbocharger, the oxidation catalytic converter, the feed device for urea-water solution, the particle filter, and the SCR catalytic converter are situated relative to one another in such a way that the exhaust gas flow from an outlet from the exhaust gas turbocharger to an outlet from the SCR catalytic converter undergoes at least one deflection by 180°.

11. The engine block arrangement of claim 8, wherein the oxidation catalytic converter and the particle filter are connected to one another by a pipe, and situated relative to one another in such a way that the exhaust gas flow from an oxidation catalytic converter outlet to a particle filter inlet undergoes a deflection of 90°, or two deflections of 180°.

12. The engine block arrangement of claim 8, wherein the oxidation catalytic converter is situated substantially above the exhaust manifold.

13. The engine block arrangement of claim 8, wherein the particle filter and the SCR catalytic converter are situated substantially below the exhaust gas turbocharger and also substantially below the oxidation catalytic converter.

14. The engine block arrangement of claim 8, wherein the exhaust gas turbocharger is situated closer to the output side of the engine block than to a side of the engine block facing away from the output side of the engine block, the oxidation catalytic converter being situated closer to the side facing away from the output side of the engine block than to the output side of the engine block.

15. An engine block arrangement, comprising:
an engine block; and
an exhaust gas system comprising, in a flow direction of an exhaust gas flow, an exhaust gas turbocharger, an oxidation catalytic converter, a feed device for a urea-water solution, a particle filter, and an SCR catalytic converter arranged one behind the other,
wherein the exhaust gas turbocharger, the oxidation catalytic converter, the feed device for urea-water solution, the particle filter, and the SCR catalytic converter are situated together on the engine block along one side thereof, the exhaust gas turbocharger and the oxidation catalytic converter being situated relative to one another in such a way that the exhaust gas flow from an exhaust gas turbocharger outlet to an oxidation catalytic converter inlet undergoes a deflection of 90°, the exhaust gas flowing through the oxidation catalytic converter in a direction that is oriented perpendicularly with respect to the longitudinal direction of the engine block, and oriented toward a bottom side of the engine block, and wherein the particle filter and the SCR catalytic converter are situated substantially below the exhaust gas turbocharger.

16. The engine block arrangement of claim 15, wherein the particle filter has inlet channels and outlet channels, at least walls of the inlet channels having an SCR catalyst coating.

17. The engine block arrangement of claim 15, wherein the exhaust gas turbocharger, the oxidation catalytic converter, the feed device for urea-water solution, the particle filter, and the SCR catalytic converter are situated relative to one another in such a way that the exhaust gas flow from an outlet from the exhaust gas turbocharger to an outlet from the SCR catalytic converter undergoes at least one deflection by 180°.

18. The engine block arrangement of claim 15, wherein the oxidation catalytic converter and the particle filter are connected to one another by a pipe, and situated relative to one another in such a way that the exhaust gas flow from an oxidation catalytic converter outlet to a particle filter inlet undergoes a deflection of 90°, or two deflections of 180°.

19. The engine block arrangement of claim 15, wherein the oxidation catalytic converter is situated substantially above an exhaust manifold.

20. The engine block arrangement of claim 15, wherein the particle filter and the SCR catalytic converter are situated substantially below the oxidation catalytic converter.

21. The engine block arrangement of claim 15, wherein the exhaust gas turbocharger is situated closer to the output side of the engine block than to a side of the engine block facing away from the output side, the oxidation catalytic converter being situated closer to the side facing away from the output side of the engine block than to the output side of the engine block.

22. An engine block arrangement, comprising:
an engine block; and
an exhaust gas system, comprising, in a flow direction of an exhaust gas flow, an exhaust gas turbocharger, an oxidation catalytic converter, a feed device for a urea-water solution, a particle filter, and an SCR catalytic converter arranged one behind the other,
wherein the exhaust gas turbocharger, the oxidation catalytic converter, the feed device for urea-water solution, the particle filter, and the SCR catalytic converter are situated together on the engine block along one side of the engine block that is oriented perpendicularly with respect to an output side of the engine block, and the exhaust gas turbocharger is situated substantially above an exhaust manifold, and
wherein the exhaust gas turbocharger, the oxidation catalytic converter, the feed device for urea-water solution, the particle filter, and the SCR catalytic converter are situated relative to one another in such a way that the exhaust gas flow from an outlet from the exhaust gas turbocharger to an outlet from the SCR catalytic converter undergoes at least one deflection by 180°.

* * * * *